United States Patent [19]

Tsuchitani et al.

[11] Patent Number: 4,921,345
[45] Date of Patent: May 1, 1990

[54] SPATIAL FILTER TYPE SPEED MEASURING APPARATUS

[75] Inventors: Shigeki Tsuchitani, Mito; Seikou Suzuki, Hitachioota; Masahiro Matsumoto, Hitachi, all of Japan

[73] Assignee: Hitachi, Ltd., Tokyo, Japan

[21] Appl. No.: 240,625

[22] Filed: Sep. 6, 1988

[30] Foreign Application Priority Data

Sep. 7, 1987 [JP] Japan ............................... 62-222123

[51] Int. Cl.⁵ .......................... G01P 3/36; G01C 3/00
[52] U.S. Cl. ......................................... 356/28; 356/1
[58] Field of Search .................................. 356/1, 4, 28

[56] References Cited

U.S. PATENT DOCUMENTS

| | | | |
|---|---|---|---|
| 3,994,583 | 11/1976 | Hutchins | 356/28 |
| 4,130,360 | 12/1978 | Courtenay | 356/28 |
| 4,273,430 | 6/1981 | Fritsche et al. | 356/28 |
| 4,329,047 | 5/1982 | Kikuchi et al. | 356/28 |
| 4,634,878 | 1/1987 | Fricke | 356/28 |
| 4,696,567 | 9/1987 | Ruger et al. | 356/28 |
| 4,725,136 | 2/1988 | McCullough et al. | 356/28 |

*Primary Examiner*—Stephen C. Buczinski
*Attorney, Agent, or Firm*—Antonelli, Terry & Wands

[57] ABSTRACT

Light equipment is provided for irradiating the measuring object and forming light spot on it through the collimate lens. Reflected light from the measuring object is incident to the spatial filter through the objective lens for detecting the incidence position of the reflected light. A distance measuring circuit calculates contiuously the distance (d) between the objective lens and the measuring object by optical triangulation based on the output signal from the spatial filter. The frequency detecting circuit is connected to the spatial filter. When the sought running speed is V, the pitch between each equivalent light receiving element p, and the magnification of the optical image of the measuring object M, the frequency detecting circuit measures the frequency f which is given by the formula of $F=MV/p$. The calculator calculates the velocity V based on the output signal from the distance measuring circuit and on the output signal from the frequency detecting circuit.

4 Claims, 5 Drawing Sheets

SPATIAL FILTER TYPE SPEED MEASURING APPARATUS

FIELD OF THE INVENTION

The present invention relates to a spatial filter type speed measuring apparatus which measures a relative speed of an object by detecting an optical image of a surface of the object using the spatial filter and analyzing the output signal of the spatial filter. More particularly, the present invention relates to a speed measuring apparatus which is useful for antiskid control of an automobile.

BACKGROUND OF THE INVENTION

Conventionally, it is known that the revolutional speed of a wheel of a vehicle such as an automobile is detected, and after that, running speed thereof is obtained for determining the running speed of the vehicle.

However, the method is affected by alterations in the diameter of the wheel, and moreover when the wheel is slipped, speed measuring thereof is not possible. Accordingly, the measured speed can not be used for detecting an exact speed which is necessary for an antiskid control.

Therefore, apparatus, which is able to detect an absolute velocity of a vehicle by using a so-called a spatial filter, has been developed, so that the spatial filter is used for an antiskid control. For instance such a speed measuring apparatus using a spatial filter is disclosed in FIGS. 2 and 3 of Japanese Patent Laid-Open No. 52-143081 published on Nov. 29, 1977 in the title of "Speed Measuring Apparatus of running object using Spatial Filter type Detector".

In a speed measuring apparatus using such a spatial filter, it is necessary that an image formation optical system be used for forming an optical image of a surface of a measuring object, such as a road, on a photoelectric transformation surface of the spatial filter. On account of this, when the distance between a measuring apparatus comprising a spatial filter and a measuring object is changed, measuring error increases.

For preventing the error, the prior art apparatus explained above art discloses a so-called telecentric optical system which equips a light shield plate having a small hole between an objective lens in an image formation optical system for forming an image of a surface of a measuring object and an photoelectric transformation surface of the spatial filter. According to the prior art explained above, the change of magnification of an optical image caused by the change of the distance is prevented and measuring error does not occur.

Hereunder, we will explain the prior art. Referring to the prior art shown in FIG. 2, an objective lens 1 is opposed to a surface of a measuring object 10 such as a road surface which is in the opposite side of a vehicle such as a running automobile. The surface image of the measuring object 10 has random patterns of irregularities or density of the surface which are irradiated by the light 41 from a light source 9, and are projected on a spatial filter detector 2. As the detector 2 of the spatial filter, for instance as shown in FIG. 3, a silicon solar cell having light receiving portions 12 formed in the shape of teeth of a comb is used. In FIG. 3, 13 denotes electrodes, 14 substrate, and 15-1, 15-2, 16 lead wires.

Movement of a surface image pattern having the same pitch as the pitch P of the light receiving portion 12 emphasizes the surface images of the measuring object 10. The other patterns of the surface image of the measuring object 10 not having the same pitch as the pitch P of the light receiving portion 12 are not output, since the change of the photo currents from each light receiving portion 12 of the silicon solar cell 2 eliminate each other and the output signal of the detector of the spatial filter system, which is the summation of each photo current, becomes almost independent of time.

The frequency output from the detector 2 corresponds to a reciprocal of a time which is equal to a time interval in which one pitch of the surface image of the measuring object 10 passes same length of one pitch P of the light receiving portion 12 of the detector 2 of the spatial filter system. When the running speed of the vehicle is v, the arranged pitch of the light receiving portion 12 of the detector 2 is p, and the magnification of the projected image is M, the frequency f of the signal obtained at a frequency detecting circuit 5 from the detector 2 through an amplifier 3 is $$f = \frac{Mv}{P},$$

and proportional to the velocity v, so that the velocity can be detected.

Incidentally, when the objective lens 1 is used as an image formation optical system, and the distance from the measuring object 10 to the lens 1 is d as shown in FIG. 2, but a light shield plate 11 having a small hole on a focus is not disposed; the magnification M of the projected image becomes $$M \alpha \frac{1}{d}.$$

In this case, when the distance d is changed, the output frequency f of the detector 2 of the spatial filter system is varied so that an error in speed detection is caused.

On the contrary, when the light shield plate 11 having a small hole on a focus of the lens 1 is arranged as disclosed on FIG. 2, in the light reflected from one point P on the surface of the measuring object 10 only light 45 transmitted on a parallel direction of the optical axis of the lens 1 reaches the detector 2 of the spatial filter system. Even if the distance d is changed, a light reflected from the point P passes along the same route and reaches the same position on a light receiving element 32 arranged on a substrate 31 of the detector 2 of the spatial filter system. Accordingly, in the apparatus of FIG. 2, the magnification M of the projected image does not change corresponding to the change of the distance d. However, the apparatus shown in FIG. 2 can not avoid the amplitude of the output signal becoming smaller, since the brightness of the image on the detector 2 of the spatial filter system 2 becomes dark.

As explained above, the apparatus of the prior art does not consider the decrease of the light amount based on using the light shield plate, and the decrease of the signal level from the spatial filter, so that it has a drawback of measuring error depending on decreasing the signal versus noise (S/N).

A spatial filter used for an automobile has to be located at the outside of the floor surface of the automobile facing to the ground. In this case, the spatial filter has difficulty obtaining sufficient reflected light from the measuring object, since the objective lens is easily soiled. Accordingly, the spatial filter of the prior art is in the condition that the S/N ratio is easily lowered, so that there is a danger that a large measuring error might occur or that measurement is not possible.

SUMMARY OF THE INVENTION

An object of the present invention is to supply a spatial filter type speed measuring apparatus which is not affected by a change in the magnification of the image pickup optical system caused by a change in the distance, does not have light volume loss, always maintains a sufficient signal level, and is able to suppress the generation of the measuring error.

The object of the present invention can be attained by equipping a means for detecting the distance between a collimate lens explained later and the measuring object by optical triangulation, detecting continuously the distance in real time when the speed of the vehicle is being measured, and compensating the result of the measured output frequency of the spatial filter.

When the distance between the measuring object and the measuring portion of the spatial filter is varied, an error occurs in the speed measuring result corresponding to the variation of the distance. According to the present invention, since the speed measuring result is compensated by the distance detecting result, the error can be deleted so that the right speed can be detected.

DETAILED DESCRIPTION OF THE PREFERRED EMBODIMENTS

Figure 1:
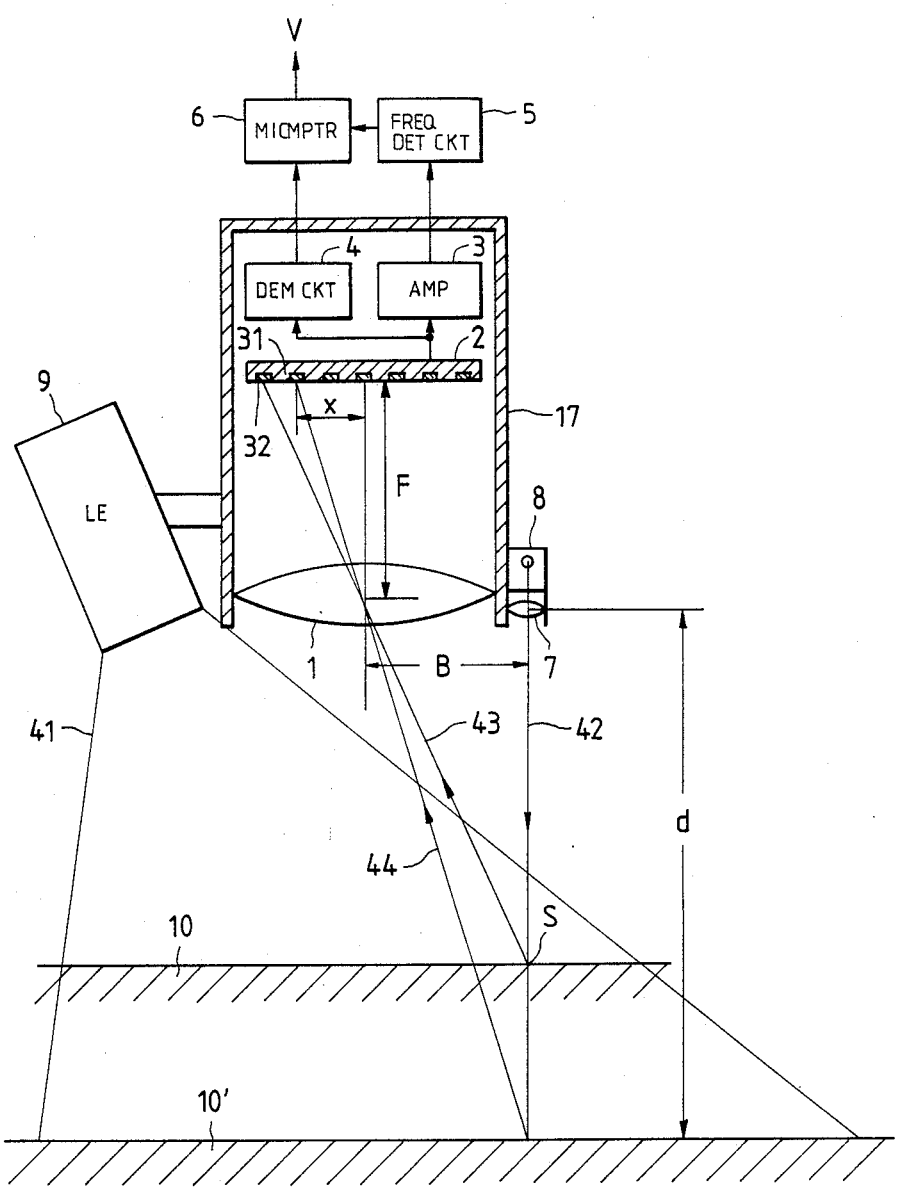
FIG. 1 shows one embodiment of the spatial filter type speed measuring apparatus of the present invention.
Figure 2:
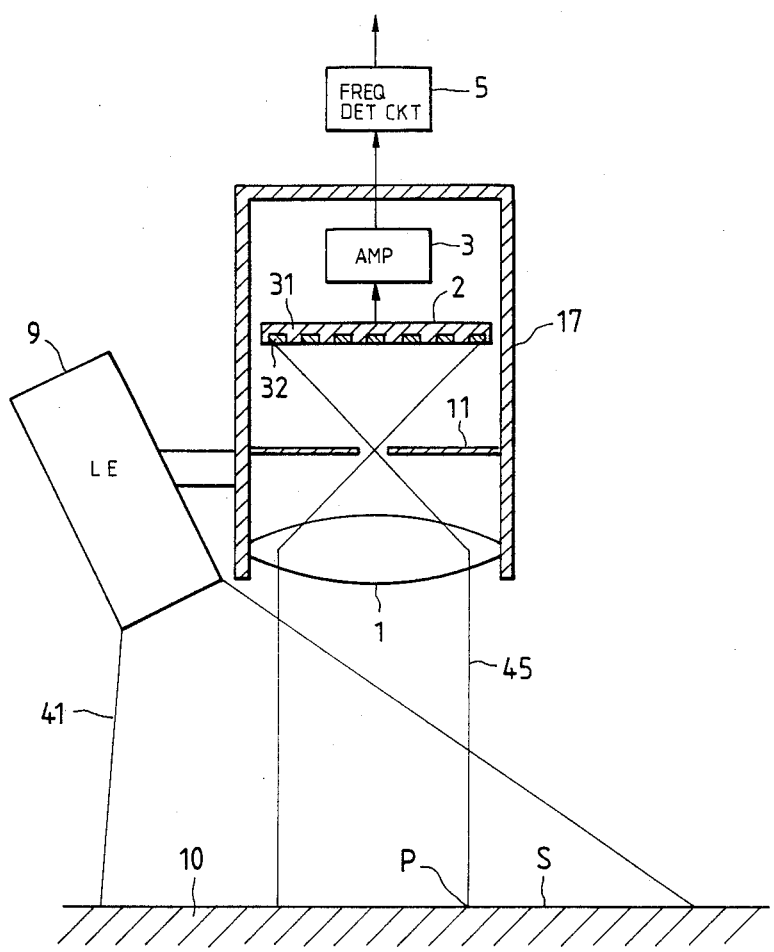
FIG. 2 shows a spatial filter type speed measuring apparatus of the prior art.
Figure 3:
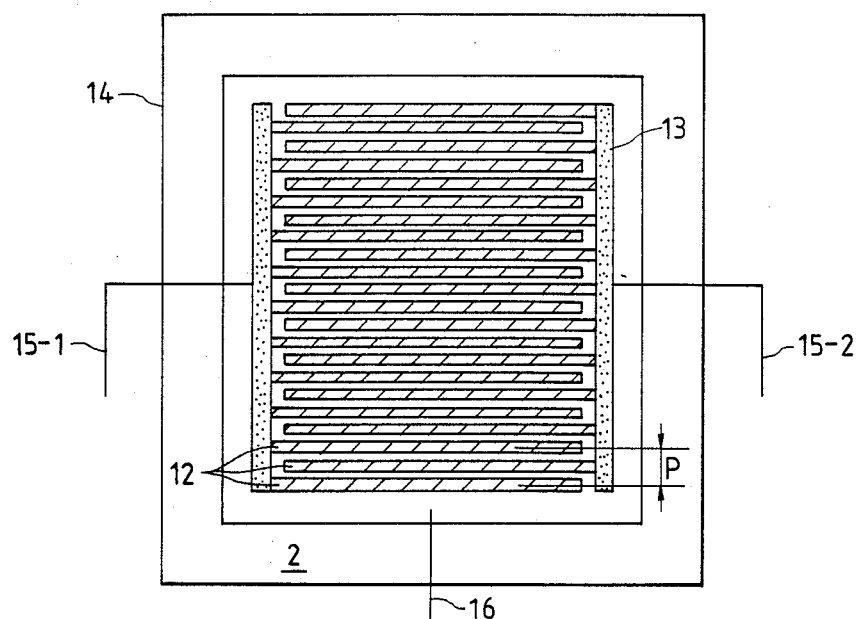
FIG. 3 shows one embodiment of a detector of a spatial filter system in a prior art.
Figure 5:
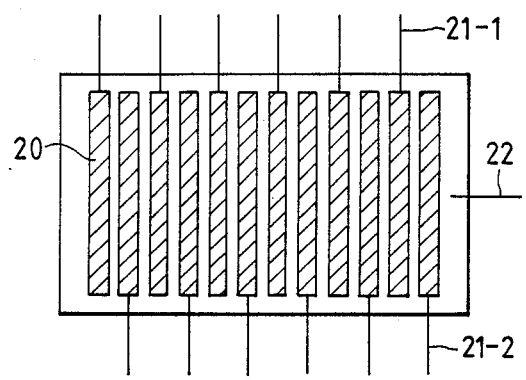
FIG. 5 shows one embodiment of a detector of a spatial filter system of the present invention.

Referring to FIG. 1, the spatial filter 2 is constituted in the structure that the light receiving element 20 is divided separately as shown in FIG. 5. In FIG. 5, 21-1 and 21-2 show lead wires connected to each light receiving element 20. 22 is a common lead wire. Returning to FIG. 1, 8 is a light equipment comprising, for example a light-emitting diode (LED) or laser diode (LD) for measuring distance. The light equipment 8 is equipped with a lens 7 used in a collimator. The collimate lens 7 works for forming a light spot S on the measuring object 10. For avoiding influence of background light etc., the LED or LD are flashed in a series of pulses and signal current generated by the reflected pulse light is detected, amplified, and calculated. Light 42 passed by the collimate lens 7 is reflected on the surface S of the measuring object 10. The reflected light 43, 44 from the surface of the measuring object 10 passes the objective lens 1, and the image of the measuring object 10 is projected on the surface of the detector 2 of the spatial filter system.

The output signal from each light receiving element 20 of the detector 2 of the spatial filter system is input to the distance measuring circuit 4 and it is determined which light receiving element the light reflected at the light spot on the surface of the measuring object 10 is incident. After the output signal from each light receiving element 20 is weighted and added, and amplified by the amplifier 3; the frequency f is obtained at the frequency detecting circuit 5 corresponding to the velocity V of the measuring object and the distance between the collimate lens 7 and the measuring object 10. The microcomputer 6 outputs the right velocity V by compensating for the variation of the distance d.

Figure 6:
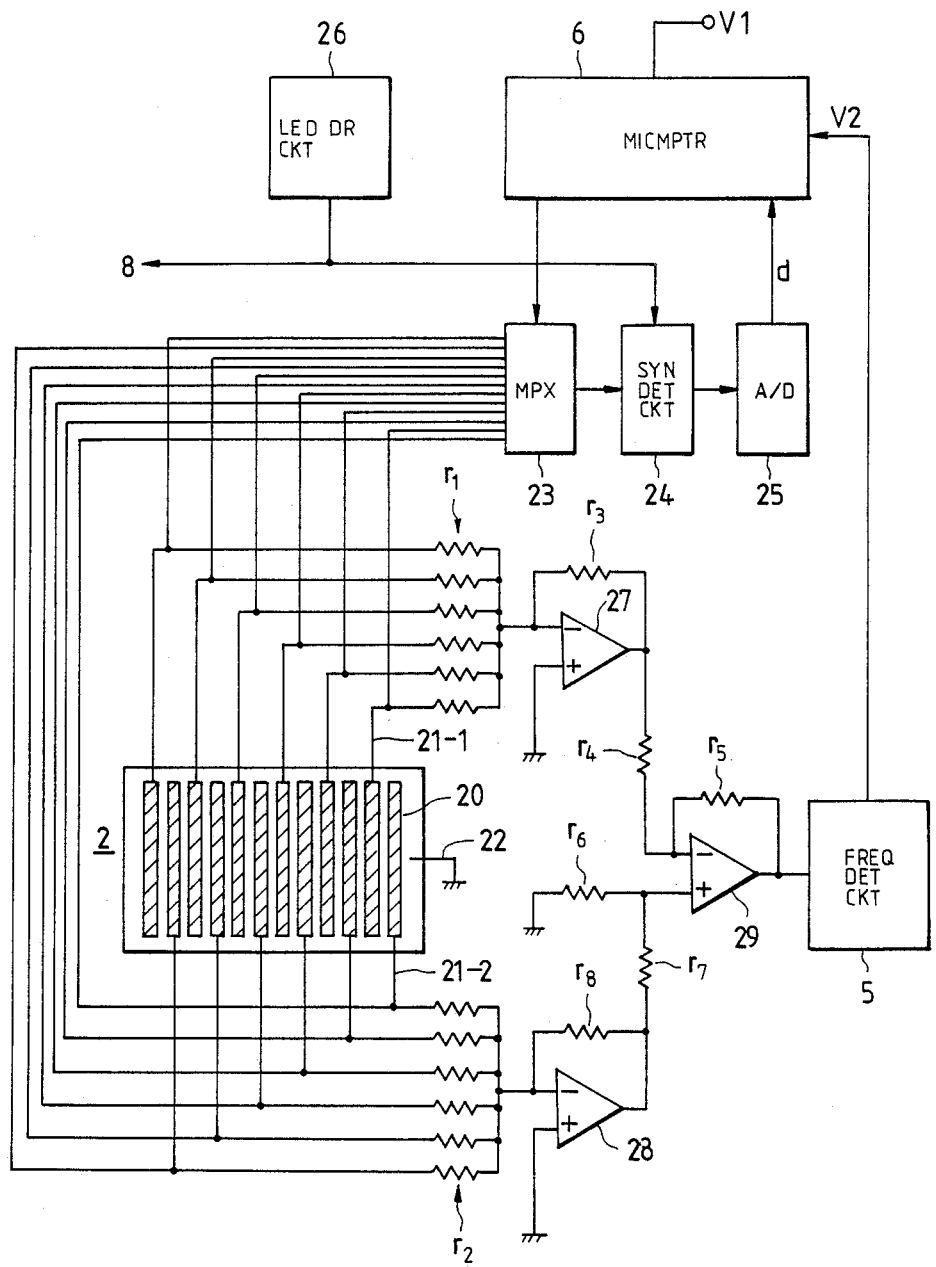
FIG. 6 shows one embodiment of a signal processing circuit applied to the present invention.

Referring to FIG. 6, the signal from each light receiving element 20 is input to the multiplexer 23. The synchronous detecting circuit 24 detects the reflected light intensity in each light receiving element. 26 denotes a LED or LD driving circuit which flashes the LED or LD of the light equipment 8 in a series of pulses. In this case, the flashing frequency is set to a frequency which is higher than the upper limit of the signal frequency of the detector 2 of the spatial filter system corresponding to the measuring velocity. The output signal from the synchronous detecting circuit 24 is converted to a digital signal by the A/D converter, and input to the microcomputer 6. The microcomputer 6 controls the multiplexer 23, and measures distance d between the collimate lens 7 and the measuring object 10 based on the intensity of the distance signal to each light receiving element 20 as explained below.

Figure 4:
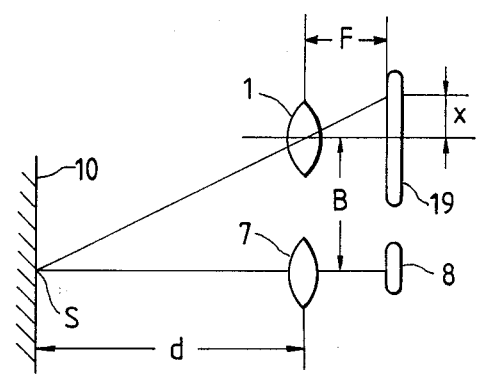
FIG. 4 is an explanation diagram of a distance measuring principle of the present invention.

Hereunder, we will explain the measuring principle of the distance referring to FIG. 4. The measuring method of the distance applies the principle of triangulation. The light spot is formed on the surface of the measuring object 10 by the light equipment 8, the reflected light from the measuring object 10 is received on the primary position detecting element 19 (PSD), and the distance d is calculated at a calculating circuit (not shown) in the microcomputer 6 based on the converging position on the detector 2.

In FIG. 4, when the distance between the collimate lens 7 and the measuring object 10 is d, the gap between the PSD 19 and the objective lens 1 F, the optical axis distance between two lenses 1 and 7 B, and the distance between the converging point of light on the PSD 19 when the measuring distance is infinite and that when the measuring distance is d X; the distance d is as follows:

$$d = \frac{F \cdot B}{X} \quad (1)$$

In the embodiment shown in FIG. 1, the detector 2 of the spatial filter system is also used as the position detecting element 19 for obtaining the distance between the sensor and the measuring object. The microcomputer 6 reads the signal through the multiplexer 23, the synchronous detecting circuit 24, and the A/D converter 26, after that it inspects whether either one of the light receiving elements 20 received the signal based on the light spot S projected by the light equipment 8 so that the distance X explained in formula (1) can be obtained. Since F and B in the formula (1) are constant, the distance d can be calculated based on the formula (1) when the distance X is obtained.

As shown in FIG. 6, the output signals from each light receiving element 20 are divided into the output signals from the odd number lines thereof and the even number lines thereof, the output signals from the odd number lines and the even number lines are added, respectively, through the resistors $r_1$ and $r_2$ used for weighting the signals, are inverted to the voltage signals by the amplifiers 27, 28, are supplied to the positive input and the negative input terminals of the calculating amplifier 29, and then the differential signal from the amplifier 29 is input to the frequency detecting circuit 5.

As apparent from the explanation mentioned above, the distance X shown in FIG. 4 is decided depending on the signal the light equipment 8 generates at any one of the light receiving elements 20 of the detector 2 of the spatial filter system. Accordingly, the detecting resolution of the distance X is decided depending on the pitch p of the light receiving element 20.

Since the light spot S has a certain stretch, the center point of the image of the light spot S on the spatial filter can be measured with an accuracy smaller than pitch P of the light receiving element 20 by detecting the signal intensity distribution among the several light receiving elements, so that the position detecting resolution can be improved.

According to the present invention, the velocity V of the vehicle can be obtained in the microcomputer 6 as follows:

$$V = \frac{fpB}{X} \quad (2)$$

Figure 7:
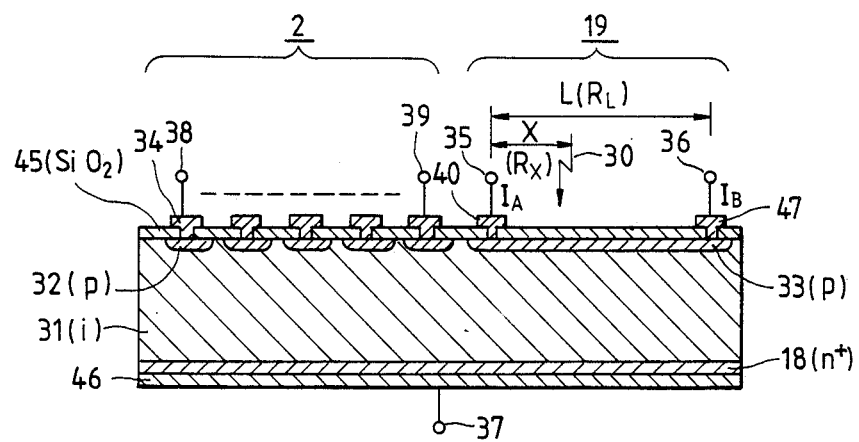
FIG. 7 shows another embodiment of a detector of a spatial filter of the present invention.

The detector of the spatial filter shown in FIG. 7 comprises the detector 2 of the spatial filter system and the PSD 19 respectively in function. However, the detector shown in FIG. 7 is composed of the monolithic semiconductor device. Additional structure of the detector shown in FIG. 7 is same as that shown in FIG. 1.

Referring to FIG. 7, 31 is the i type high resistance silicon substrate. On the surface of the substrate 31, the detector 2 of the spatial filter and the semiconductor position detecting element 19 are formed monolithic. The semiconductor position detecting element (PSD) 19 is a photodetecting element applied by the silicon photodiode. A uniform P type resistance layer 33 is formed on the substrate 31. The PN junction is formed between the resistance layer 33 and the substrate 31. When the incident light 30 radiates the resistance layer 33, the photo current flows based on the photoelectromotive force, and the position of the light spot can be detected.

The detector 2 of the spatial filter system comprising the solar cell utilizes the effect of the photoelectromotive force based on the PIN structure. The P type layer 32 and the electrodes 34 are formed on the substrate 31. 18 is a n+ type resistance layer. 45 is a SiO2 insulating layer. 37, 38 ... 39 denote terminals.

A pair of electrodes 40, 47 and terminals 35, 36 for leading out the signal are disposed on both sides of p type resistance layer 33 in the PSD 19. Suppose that the distance between the electrodes 40 and 47 is L, the resistance value therebetween is $R_L$, the distance between the electrode 40 and the incidence position of the light is X, and the resistance value at the portion is $R_X$. The photo current $I_o$ generated at the incidence position of the light is divided so proportional to be inversely as the resistance value of the electrodes 40 and 47. Accordingly, the currents $I_A$ and $I_B$ output from the electrodes 40 and 47 are as follows:

$$\left. \begin{array}{l} I_A = I_o(R_L - R_X)/R_L \\ I_B = I_o R_X/R_L \end{array} \right\} \quad (3)$$

When the resistance layer 33 is uniform, and the resistance value thereof is proportional to its length, the formular (3) is as follows:

$$\left. \begin{array}{l} I_A = I_o(L - X)/L \\ I_B = I_o X/L \end{array} \right\} \quad (4)$$

When the position signal $P_I$ is regarded as the ratio of the current $I_A$ and $I_B$, the position signal $P_I$ is as follows:

$$P_I = L/X - 1 \quad (5)$$

According to the embodiment disclosed in FIG. 7, the position signal can be attained without respecting the light intensity and the variation thereof. Since the P type resistance layer 33 is formed inseparable, continuous position detecting can be carried out. Accordingly, a light spot moving at a high speed can be detected in high accuracy. The detector 2 of the spatial filter system forms a number of light receiving elements 20 on the P type layer 32 and the electrodes 34, and the desired function of the spatial filter can be obtained.

Since the spatial filter type speed measuring apparatus of the present invention measures the distance between the objective lens and the measuring object and compensates the distance in real time, the moving speed of the measuring object can be obtained without being affected by the distance Since the detector of the present invention is not necessary to provide a light shield plate having a small hole on the focus of the objective lens, the output signal from the detector of the spatial filter is obtained sufficiently. Even if the optical system is dirty, the incidence light volume is decreased, and the reflection rate of the measuring object is lowered, it can measure the speed accurately.

According to the present invention, since the detector of the spatial filter system can serve as the position detecting element, it is not necessary at all to prepare an additional position detecting element.

What we claim is:

1. A spatial filter type speed measuring apparatus which detects a velocity by analyzing an optical image of a measuring object using a spatial filter comprising:
    a distance measuring means which calculates continuously a distance between an objective lens and said measuring object by optical triangulation; and
    a frequency detecting circuit connected to said spatial filter for obtaining a frequency f which is related to a running velocity V of said measuring object by a formula of $$f = \frac{M \cdot V}{p},$$

where p is a pitch between each equivalent light receiving element of said spatial filter, and M is a magnification of a projected image of said measuring object,
    wherein said distance measuring means is connected to said frequency detecting circuit, for compensating said magnification M by a reciprocal of the distance calculated in said measuring step, and outputting said running speed V in a real time by a calculation of $$V = \frac{f \cdot p}{M}.$$

2. A spatial filter type speed measuring apparatus according to claim 1, wherein
said distance measuring means calculates a distance d by a formula $$d = \frac{F \cdot B}{X},$$

where F is a distance between said spatial filter and said objective lens for projecting an image of said measuring object on said spatial filter, B is a distance between an optical axis of a first lens for irradiating a light from a light source to a surface of said measuring object and an optical axis of said objective lens which is used for forming an image of a light spot formed on the surface of said measuring object by the light on said spatial filter, and X is the distance between a converging point of light on the spatial filter when a measuring length is infinite and when the measuring length is a certain value.

3. A spatial filter type speed measuring apparatus according to claim 1, wherein
said distance measuring means comprises a light source for forming a light spot on the surface of said measuring object and a primary photo receiving position detecting means which receives reflected light from said measuring object, wherein the spatial filter serves both as the primary photo receiving position detecting means.

4. A spatial filter type speed measuring apparatus according to claim 1, wherein
said distance measuring means comprises a light source for forming a light spot on the surface of said measuring and a primary photo receiving position detecting means which receives reflected light from said measuring object, wherein the primary photo receiving position detecting means operates separately from the spatial filter on a same substrate.

* * * * *